United States Patent [19]

Kim et al.

[11] Patent Number: 5,452,320
[45] Date of Patent: Sep. 19, 1995

[54] METHOD FOR DETECTING FINE FREQUENCY DEVIATION

[75] Inventors: Young W. Kim; Byung G. No; Chang H. Jung; Jae W. Yoon; Kyo I. Chung; Kwang H. Park, all of Daejeon, Rep. of Korea

[73] Assignee: Electronics and Telecommunications Research Institute, Daejeon, Rep. of Korea

[21] Appl. No.: 173,180

[22] Filed: Dec. 28, 1993

[30] Foreign Application Priority Data

Dec. 29, 1992 [KR] Rep. of Korea ................ 1992-26052

[51] Int. Cl.6 ............................................. H04B 3/46
[52] U.S. Cl. .................................. 375/224; 455/67.4; 324/76.74
[58] Field of Search ............. 375/10; 324/78 R, 78 Z, 324/76.74; 370/17, 13; 455/67.1, 67.3, 67.4, 71

[56] References Cited

U.S. PATENT DOCUMENTS

| | | | |
|---|---|---|---|
| 4,845,685 | 7/1989 | Wechsler et al. | 375/120 |
| 5,001,724 | 3/1991 | Birgenheier et al. | 375/10 |
| 5,305,347 | 4/1994 | Roschmann et al. | 375/102 |
| 5,327,300 | 7/1994 | Satomura | 360/51 |

Primary Examiner—Stephen Chin
Assistant Examiner—T. Ghebretinsae
Attorney, Agent, or Firm—Spencer, Frank & Schneider

[57] ABSTRACT

A method for detecting a fine frequency deviation generated in a transmission line such as a general public telephone switching network. The method includes the steps of transmitting test signals to a transmission channel to be tested, receiving the test signals from the transmission channel, detecting a basic period from the received test signals, and determining a measure period on the basis of the detected basic period, performing a normalization by use of the basic period determined, extracting values of signals to be calculated, namely, object signals from those of the basic and measure periods, calculating respective absolute values of the object signals, averaging the calculated absolute values, and thereby calculating an absolute value of frequency deviation and determining a sign or direction of the frequency deviation, and determining a final frequency deviation on the basis of the sign determined from the absolute value of frequency deviation.

6 Claims, 14 Drawing Sheets

FIG. 12

| GRADIENT OF BASIC PERIOD 141 | DIFFERENCE BETWEEN MEASURE AND BASIC PERIODS 142 | DEVIATION SIGN 143 |
|---|---|---|
| + | − | − |
| − | − | + |
| + | + | + |
| − | + | − |

METHOD FOR DETECTING FINE FREQUENCY DEVIATION

BACKGROUND OF THE INVENTION

1. Field of the Invention

The present invention relates to a method for detecting a fine frequency deviation generated in a transmission line such as a general public telephone switching network.

2. Description of the Prior Art

Frequency deviations generated in transmission lines are little worth consideration when signals to be transmitted are voice signals. In data transmission using an adaptive equalizer, a signal having a frequency deviation serves as a factor of interfering with a transmission circuit adaptation function of the adaptive equalizer.

In the latter case, the degree of the frequency deviation generated should be accurately detected so as to compensate the frequency deviation. In some cases, the degree of the frequency deviation is utilized as a measure for evaluating the transmission quality of communication lines.

SUMMARY OF THE INVENTION

Therefore, an object of the invention is to provide a method for detecting a fine frequency deviation generated in a transmission line.

In accordance with the present invention, this object can be accomplished by providing a method for detecting a fine frequency deviation by use of a frequency deviation detecting apparatus comprising a central processing unit, a program memory, a signal collector serving as a digital convertor for collecting a test signal received and converting the test signal into digital signals, a data memory for temporarily storing the test signal after the signal collection, a job location memory for storing a job location adapted to temporarily store an intermediate calculation result or data to be instantly used, said method comprising the steps of: (A) selecting, from frequencies obtained when a sampling frequency of a receiving unit is divided by a positive integer, a frequency included in a transmission channel band as a frequency of said test signals, transmitting the test signals having the selected frequency to a transmission channel to be tested, receiving the test signals from said transmission channel, detecting a basic period from said received test signals, and determining a measure period on the basis of said detected basic period; (B) performing a normalization by use of the basic period determined at said step (A); (C) extracting values of signals to be calculated, namely, object signals from those of the basic and measure periods; (D) calculating respective absolute values of said object signals, averaging said calculated absolute values, and thereby calculating an absolute value of frequency deviation and determining a sign or direction of the frequency deviation; and (E) determining a final frequency deviation on the basis of said sign determined from said absolute value of frequency deviation.

BRIEF DESCRIPTION OF THE DRAWINGS

Other objects and aspects of the invention will become apparent from the following description of embodiments with reference to the accompanying drawings in which:

FIG. 12 is a table showing a rule for the sign determination.

DETAILED DESCRIPTION OF THE PREFERRED EMBODIMENTS

Figure 1:
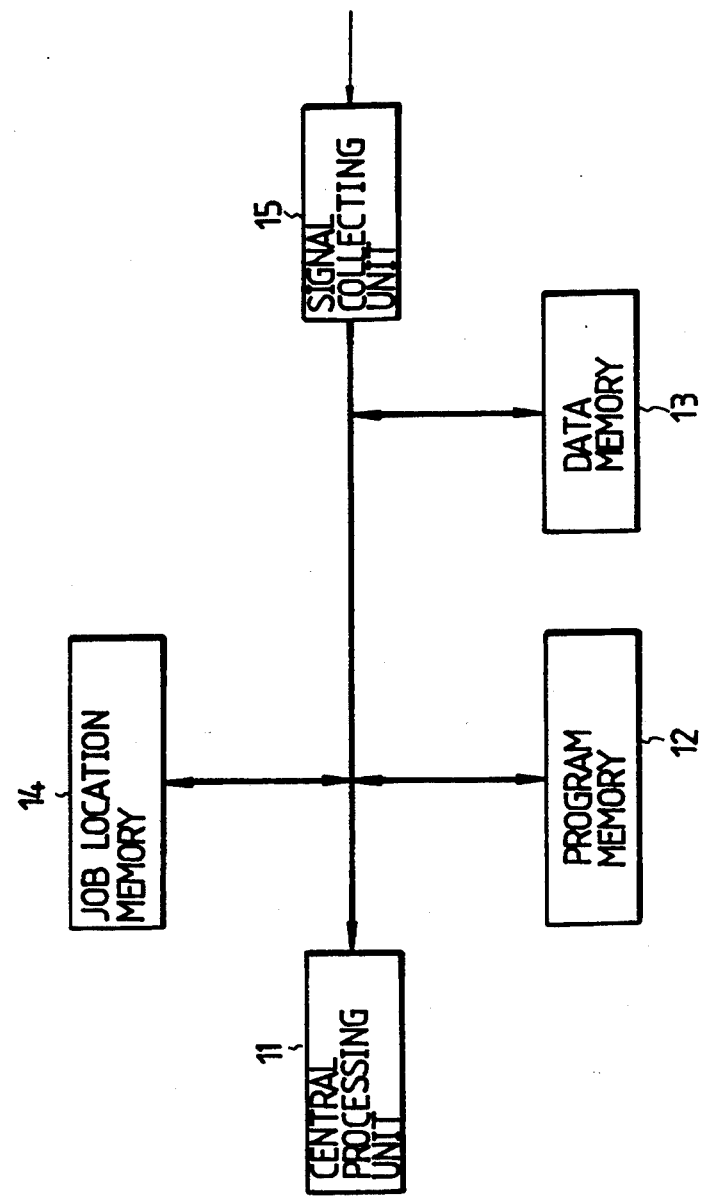
FIG. 1 is a block diagram of a hardware for realizing the present invention.

FIG. 1 is a block diagram of a hardware for realizing the present invention. In FIG. 1, the reference numeral 11 denotes a central processing unit, 12 a program memory for storing an algorithm according to the present invention, 13 a data memory for temporarily storing a receipt test signal after a signal collection, 14 a job location memory for storing a job location adapted to temporarily store an intermediate calculation result or data to be instantly used, and 15 a signal collecting unit for collecting a test signal received and converting it into a digital signal. The units 12 to 15 are controlled by the central processing unit 11 and achieve receipts and transmissions of data among them via data buses.

Figure 2:
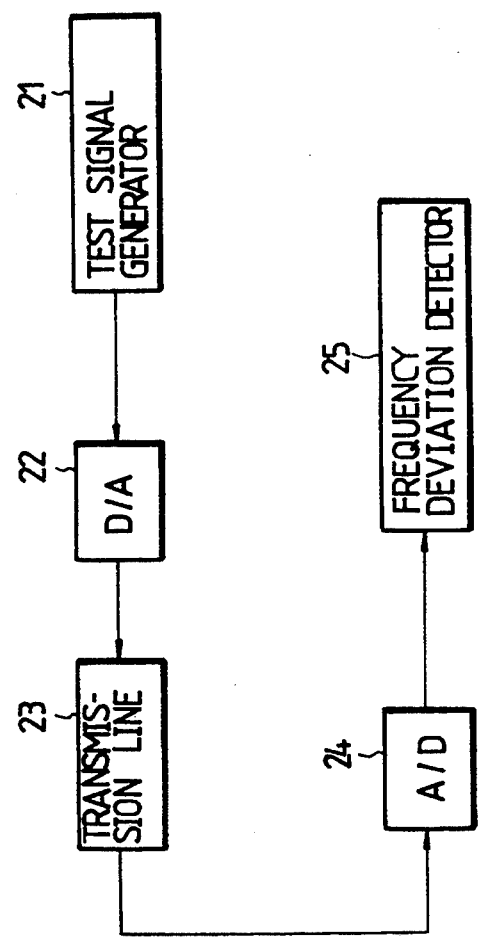
FIG. 2 is a block diagram of a hardware to which the present invention is applied.

FIG. 2 is a block diagram of a hardware to which the present invention is applied. In FIG. 2, the reference numeral 21 denotes a digital test signal generator, 22 a digital/analog (D/A) converter for transmitting a test signal from the digital test signal generator 21 to a transmission line 23 to be tested. Herein, the transmission line 23 will be described as a public telephone switching network. The reference numeral 24 denotes an analog/digital (A/D) converter for sampling the test signal received via the transmission line, collecting a sampled signal and converting it into a digital signal and the reference numeral 25 denotes a frequency deviation detector for executing a frequency deviation algorithm according to the present invention to determine the level and the sign of the frequency deviation from the collected test signal.

The frequency of the test signal generated by the test signal generator 21 and the sampling rate used in the D/A and A/D converters 22 and 24 are determined, depending on the frequency band of the transmission line 23. Since general public telephone switching networks have a transmission frequency band of about 300 to 3,400 Hz, the sampling rate for the digital signal processing may be determined to be 8 KHz in accordance with the Nyquist's theory that the sampling rate for a digital signal processing should be at least twice the maximum frequency of a transmission frequency band. As a result, the test signal must be of a frequency which is obtained when the sampling frequency is divided by a positive integer. Such a frequency includes 4 KHz, 2 KHz, 1 KHz, 500 Hz, 250 Hz, 125 Hz and etc. Among these frequencies, one is selected which belongs to the transmission frequency band. As such a frequency, 2 KHz, 1 KHz and 500 Hz may be used.

In accordance with a preferred embodiment of the present invention, 8 KHz and 1 KHz are selected as the sampling frequency and the test signal frequency, respectively.

Figure 3:
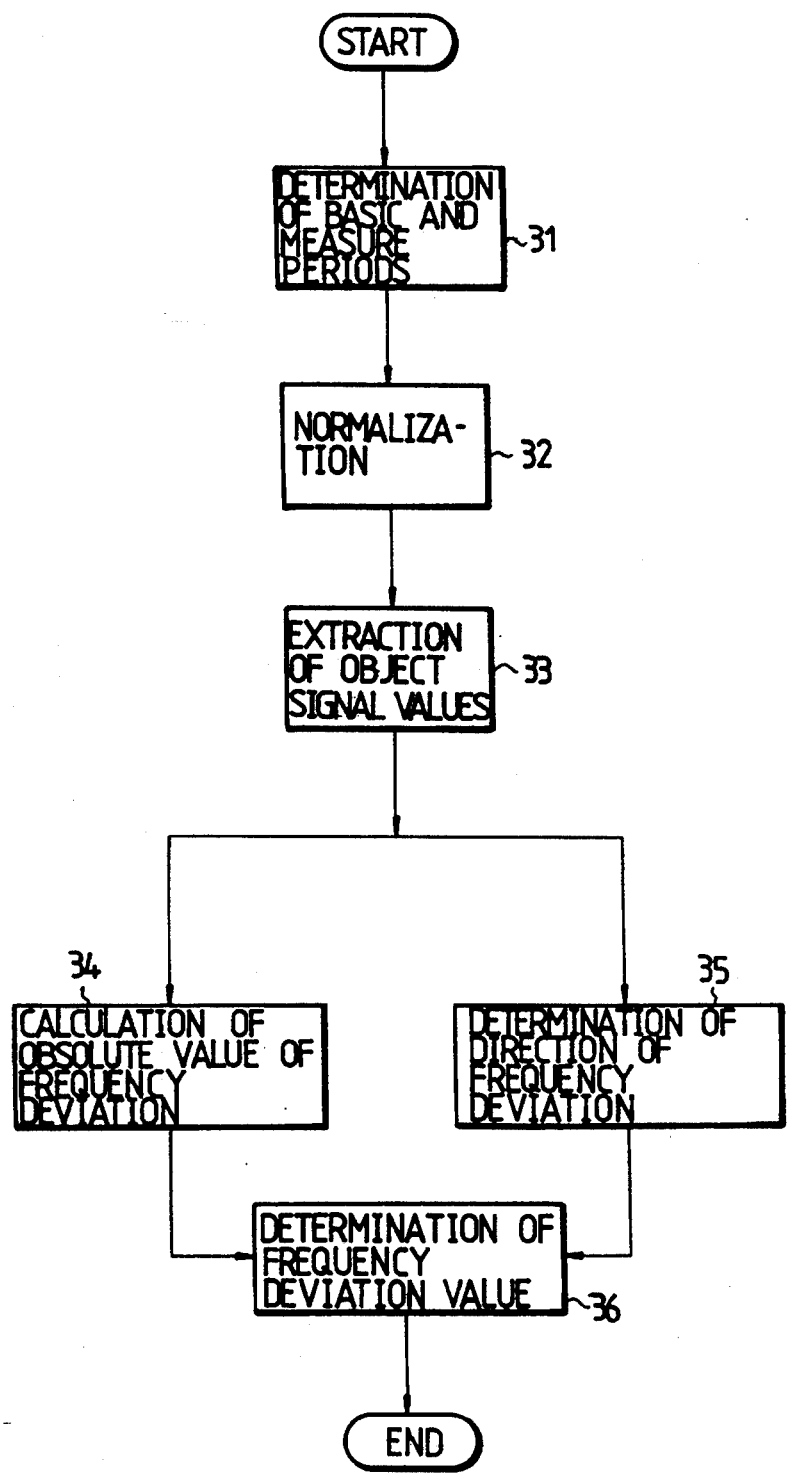
FIG. 3 is a flow chart illustrating the overall procedures of a method for detecting a fine frequency deviation in accordance with the present invention.

FIG. 3 is a flow chart illustrating the overall procedures of a method for detecting a fine frequency deviation in accordance with the present invention.

In accordance with the method, a step 31 is executed first to extract a basic period and a measure period from input test signals. Thereafter, a pre-processing procedure for a frequency deviation calculation is executed at a step 32. At the step 32, a normalization is performed to obtain a signaling power of 0.5. This normalization is achieved by calculating powers of signals present between the basic period and the measure period and then calculating an average of the calculated powers. In this case, the number of signals present between the basic period and the measure period should be an integral multiple of the number of signals present in one period of the test signals and is determined, depending on a detectable maximum frequency deviation. Where a sampling frequency of 8 KHz is used for test signals of 1 KHz, one period of test signals includes 8 test signals. In this case, 152 test signals, that is, 19 periods are present between the basic period and the measure period.

In this case, the measure period includes 8 signals received following the 152 signals.

Figure 11:
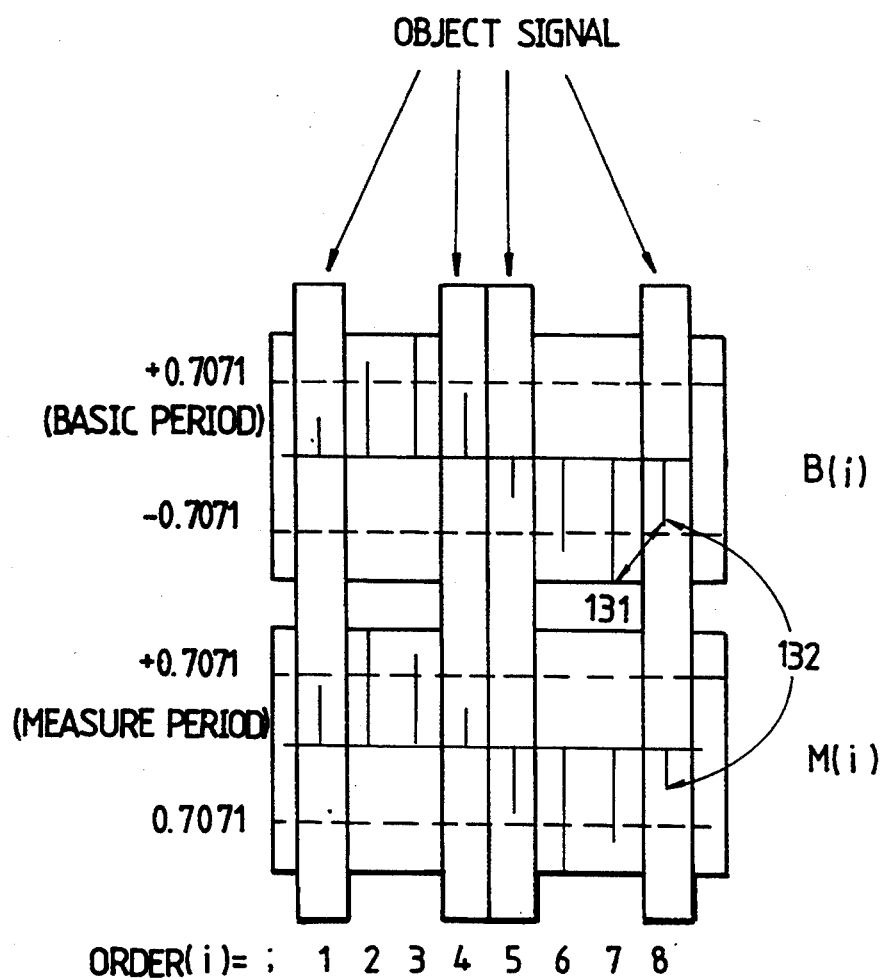
FIG. 11 is a schematic view explaining a definition of object signals to be calculated and a determination of a frequency deviation sign.

Next, the normalized signal values of the basic period and measure period are processed at a step 33 to obtain pairs each including each signal value of the basic period and each signal value of the measure period corresponding to each other in order. By this processing, 8 pairs are obtained, as shown in FIG. 11. From the pairs, ones including both signals present between $-0.7071$ and $+0.7071$ are extracted. Such signals will be referred to as object signals. By the extraction, the signal values of the object signals can be extracted. These signal values are utilized to calculate an inverse sine function in a next step, namely, a step 34 of calculating an absolute value of the frequency deviation. Since the central processing unit 11 of the general type has no instruction word for directly processing such an inverse sine function, an approximation method of developing this function in the form of a power series is used.

In this case, the inverse sine function is developed in the form of a Maclaurin's polynomial to achieve an approximate calculation at its 33rd higher-degree term, taking a real-time processing into consideration. Taking into consideration the accuracy of such an approximation method, the calculation of the inverse sine function is performed for signal values present between $-0.7071$ and $+0.7071$.

This procedure will be described in detail, in conjunction with FIG. 11. The normalized signal values of the basic period and measure period are processed to obtain signal pairs each including each signal value of the basic period and each signal value of the measure period corresponding to each other in order. By this processing, 8 signal pairs are obtained, as shown in FIG. 11. Among the 8 signal pairs, the first pair, the third pair, the fourth pair and the eighth pair are classified as including object signals.

After completion of the step 33, the step 34 is carried out for calculating an absolute value of the frequency deviation. This calculation is achieved by calculating respective absolute values of the object signals and then averaging the calculated absolute values. Subsequently, a determination is made about the sign or direction of the frequency deviation at a step 35. This is achieved by use of a sign determination method using the object signals.

The calculation at the step 34 and the sign determination at the step 35 will be described in detail, in conjunction with FIGS. 8A, 8B and 9.

Finally, a step 36 is carried out for determining a final value of the frequency deviation from the sign determined at the step 35. Thus the overall procedures are completed.

Figure 10A:
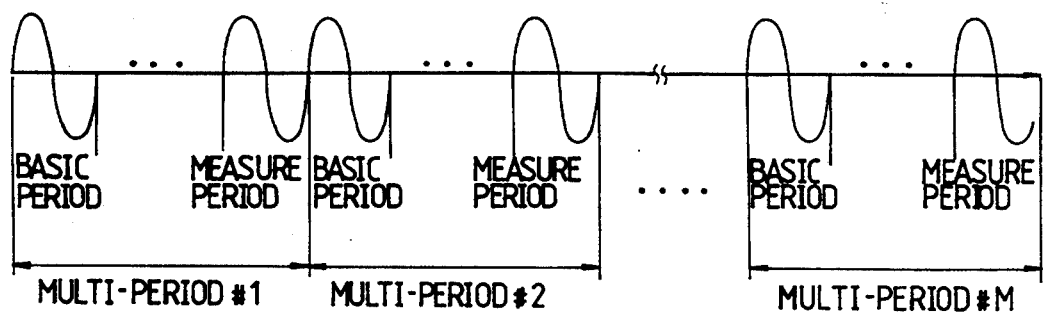
FIGS. 10A and 10B are schematic views respectively illustrating basic periods and measure periods used in a receipt signal test.
Figure 10B:
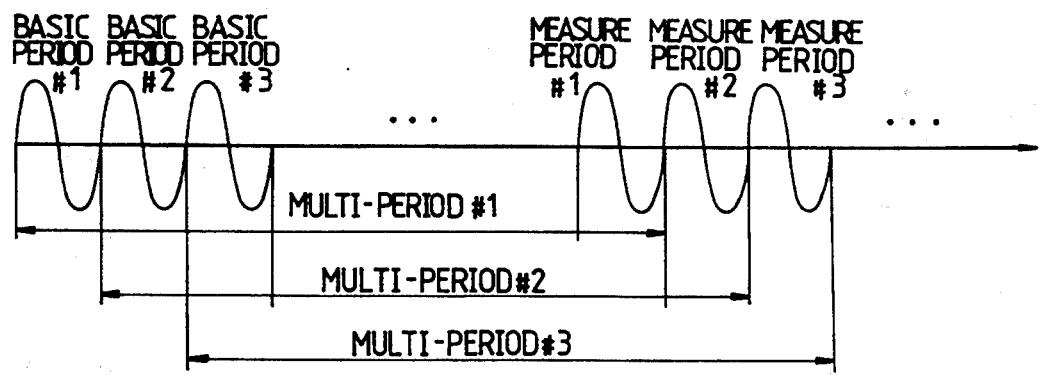

In the above procedures, the number of signals used in detecting the frequency deviation is 168. In addition, signals of about four periods are used for a stability of signals initially received. It is, therefore, understood that about 200 signals are totally required. This means that in the 8 KHz sampling, a frequency deviation of less than one Hz, for example, 0.4 Hz can be detected within a time corresponding to 25 milliseconds. Where the present invention is applied to the national public telephone switching network, an average detection error of about 10% is generated, even though such an average detection error may be varied, depending on noise states of signals received. If it is desired to improve the accuracy, a multi-period system may be used, as shown in FIGS. 10A and 10B. In this case, the frequency deviation is detected several times. The detected frequency deviations are then averaged. As a result, it is possible to eliminate an error caused by noise.

Figure 4A:
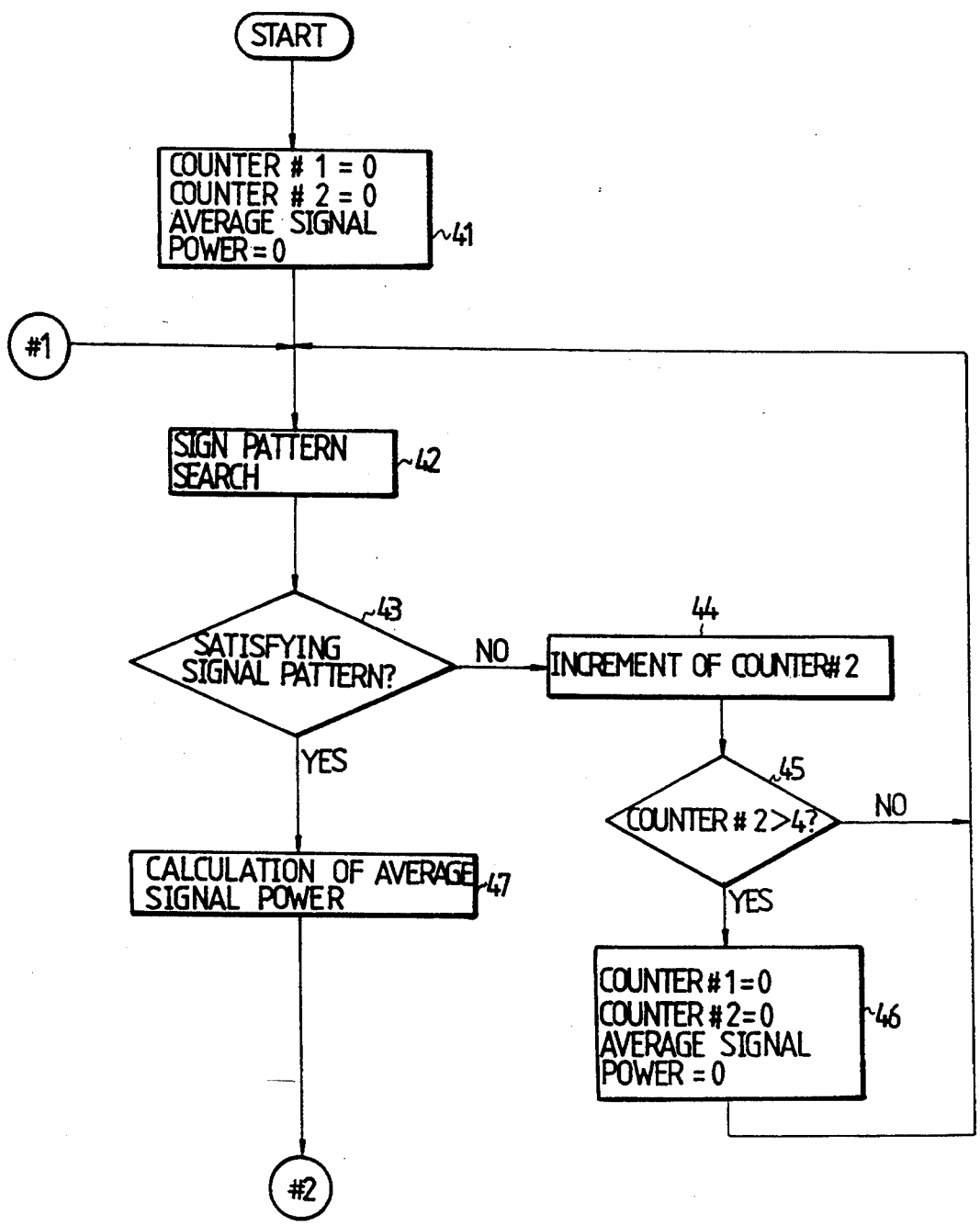
FIGS. 4A and 4B are flow charts respectively illustrating a procedure for detecting a basic period.
Figure 4B:
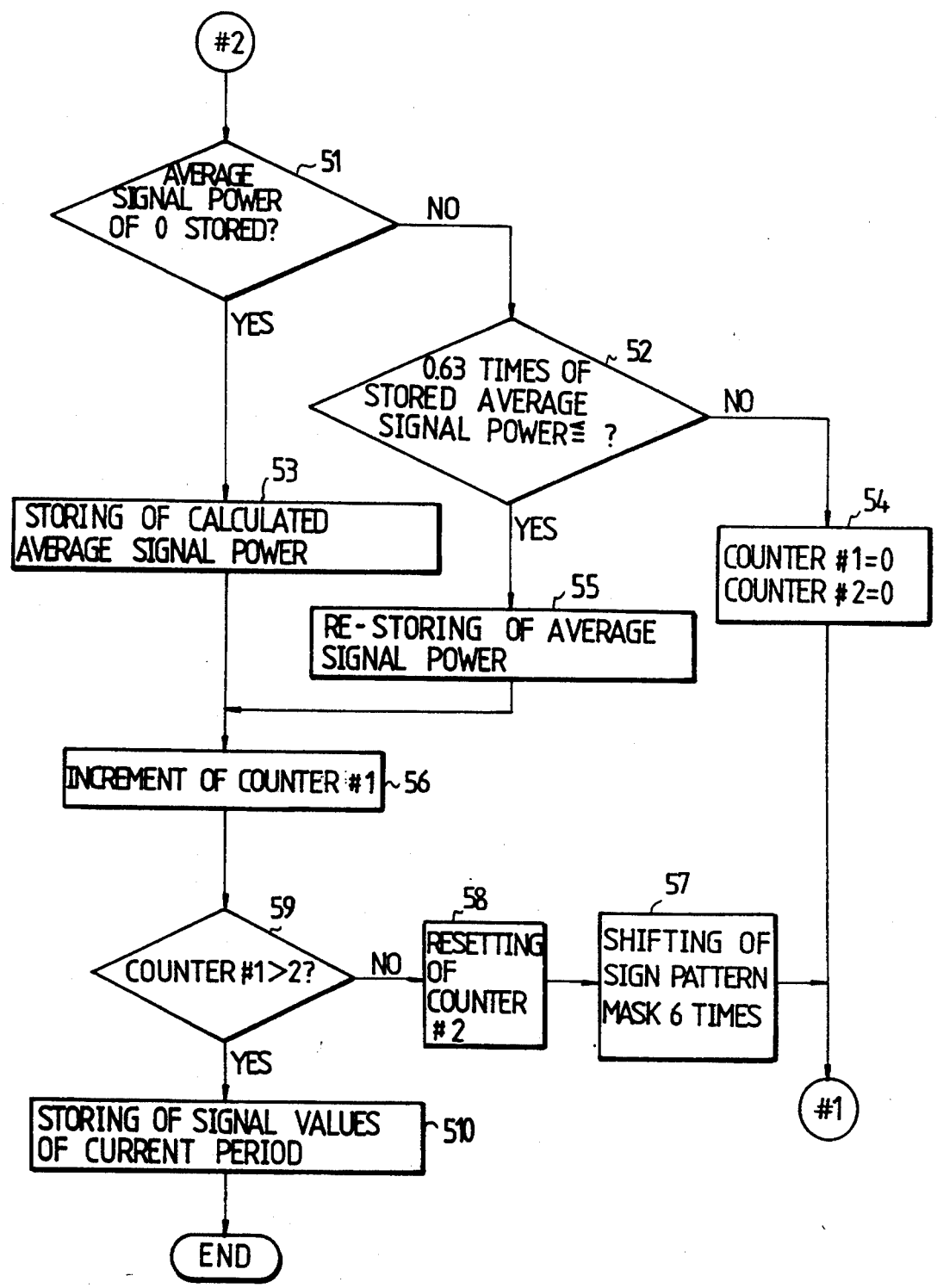

FIGS. 4A and 4B are flow charts respectively illustrating a procedure of detecting a basic period.

In the procedure, sign patterns each included within one period are sequentially searched so as to detect whether they satisfy a predetermined sign pattern. When a period satisfying the predetermined sign pattern is detected, an average signal power for the satisfying period is calculated. This average signal power obtained is compared with a previous signal power to detect a basic period of sine waves. Such a procedure will be described in detail, in conjunction with FIGS. 4A and 4B.

As shown in FIGS. 4A and 4B, an initialization for first and second counters #1 and #2 and the average signal power is carried out first at a step 41. The first counter #1 is used as means for searching whether at least three continued sine wave periods appear. On the other hand, the second counter #2 is used as means for providing a margin for the sign pattern search. Since each period of test signals is not always constituted by 8 signals due to an effect by the frequency deviation, a margin for the sign pattern search is provided by allowing signals of the number of 8±2, namely, ranged from 6 to 10 as signals to be subjected to the sign pattern search.

Thereafter, a step 42 is carried out for searching a sine wave sign pattern of each period. Referring to FIG. 9, the sign pattern search is illustrated. In FIG. 9, the symbol "+" represents a positive sign, the symbol "−" represents a negative sign, the symbol "×" represents "don't care", and the reference character "T" represents a sampling period. The sign pattern is carried out by sequentially shifting the predetermined sign pattern for signal values of one period, as denoted by the reference numeral 111, along a train of input test signals and detecting whether the current period satisfies the predetermined sign pattern.

The determined about whether the current period satisfies the predetermined sign pattern is achieved at a step 43. When the current period has been determined at the step 43 to satisfy the predetermined sign pattern, an average signal power for the satisfying period is calculated at a step 47. Thereafter, a determination is made at a step 51 about whether a previous average signal power is zero. When the previous average signal power is zero, the current average signal power calculated at the step 47 is stored. If there has been a previous average signal power, the current average signal power is compared with the previous average signal power at a step 52 so as to detect whether it is not less than 0.63 times the previously stored average signal power. When the current average signal power is not less than 0.63 times the previous average signal power, these two signal powers are averaged at a step 55 so that the resultant average value can be stored. If not, the first and second counters #1 and #2 are reset as zero at a step 54 and the procedure is returned to the step 42.

After completion of each of the steps 53 and 55, an increment by one is performed in the first counter #1 at a step 56. Then, a determination is made at a step 59 about whether the counted value of the first counter #1 has exceeded 2. When the counted value of the first counter #1 has exceeded 2, the current period satisfying the predetermined sign pattern is determined as the basic period and stored at the step 510. However, when the counted value has been determined to be less than 3, the second counter #2 is reset as zero at a step 58. Subsequently, 6 signals are received at a step 57. At this time, the shift of the predetermined sign pattern is carried out, corresponding to the signal receipt. Thereafter, the procedure is returned to the step 42 for performing the sign pattern search.

Where the current period has been determined at the step 43 not to satisfy the predetermined sign pattern, a determination is made that any test signal has not been received yet. In this case, an increment by one is performed in the second counter #2 at a step 44. Then, a determination is made at a step 45 about whether the counted value of the second counter #2 has exceeded 4. When the counted value of the second counter #2 has exceeded 4, a determination is made that no test signal has been arrived yet. In this case, an initialization for the first and second counters #1 and #2 and the average signal power is carried out at a step 46 in the same manner as at a step 41. Thereafter, the procedure is returned to the step 42 so as to continuously execute the sign pattern search. If the counted value of the first counter #1 has been determined at the step 45 to be less than 4, the sign pattern search is only executed without the initialization for the counting because this step corresponds to the step of searching the continued sine wave periods.

Figure 5:
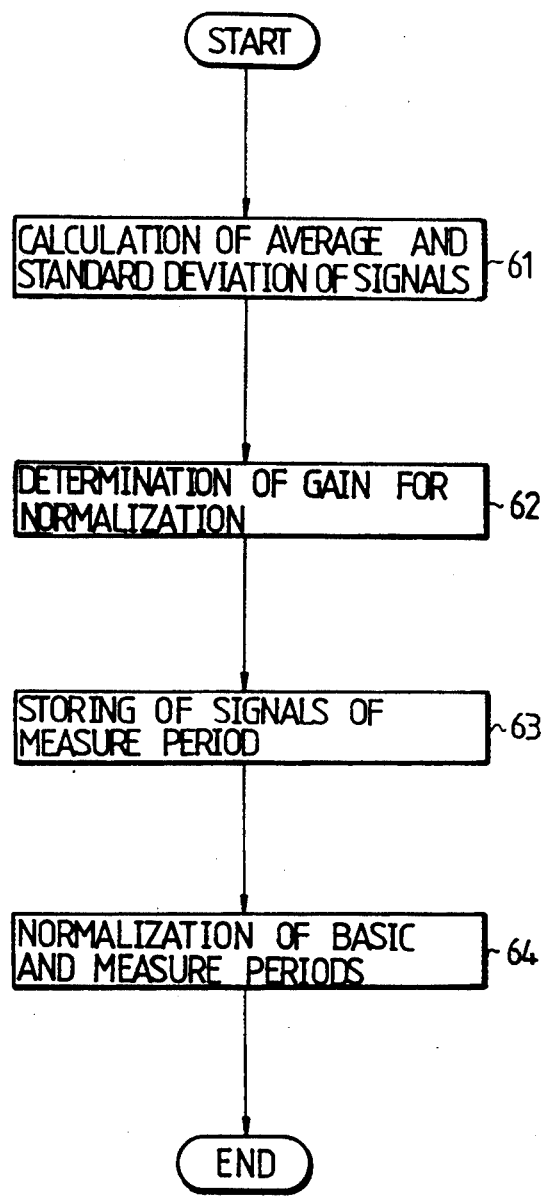
FIG. 5 is a flow chart illustrating procedures for performing a normalization and a determination of a measure period.

FIG. 5 is a flow chart illustrating the normalization executed at the above-mentioned step 32.

First, a calculation is carried out, at a step 61, for the average and the standard deviation of the 8 signals of the determined basic period, as described in FIG. 4, and the 152 signals following the 8 signals. Thereafter, a gain for normalizing the calculated standard deviation to be 0.7071067 is derived at a step 62. At a step 63, a measure period is determined by use of 8 signals subsequently received. A normalization is then executed for signal values of the determined basic period and measure period by multiplying the signal values by the normalizing gain at a step 64. The resultant values are also stored at the step 64.

Figure 6:
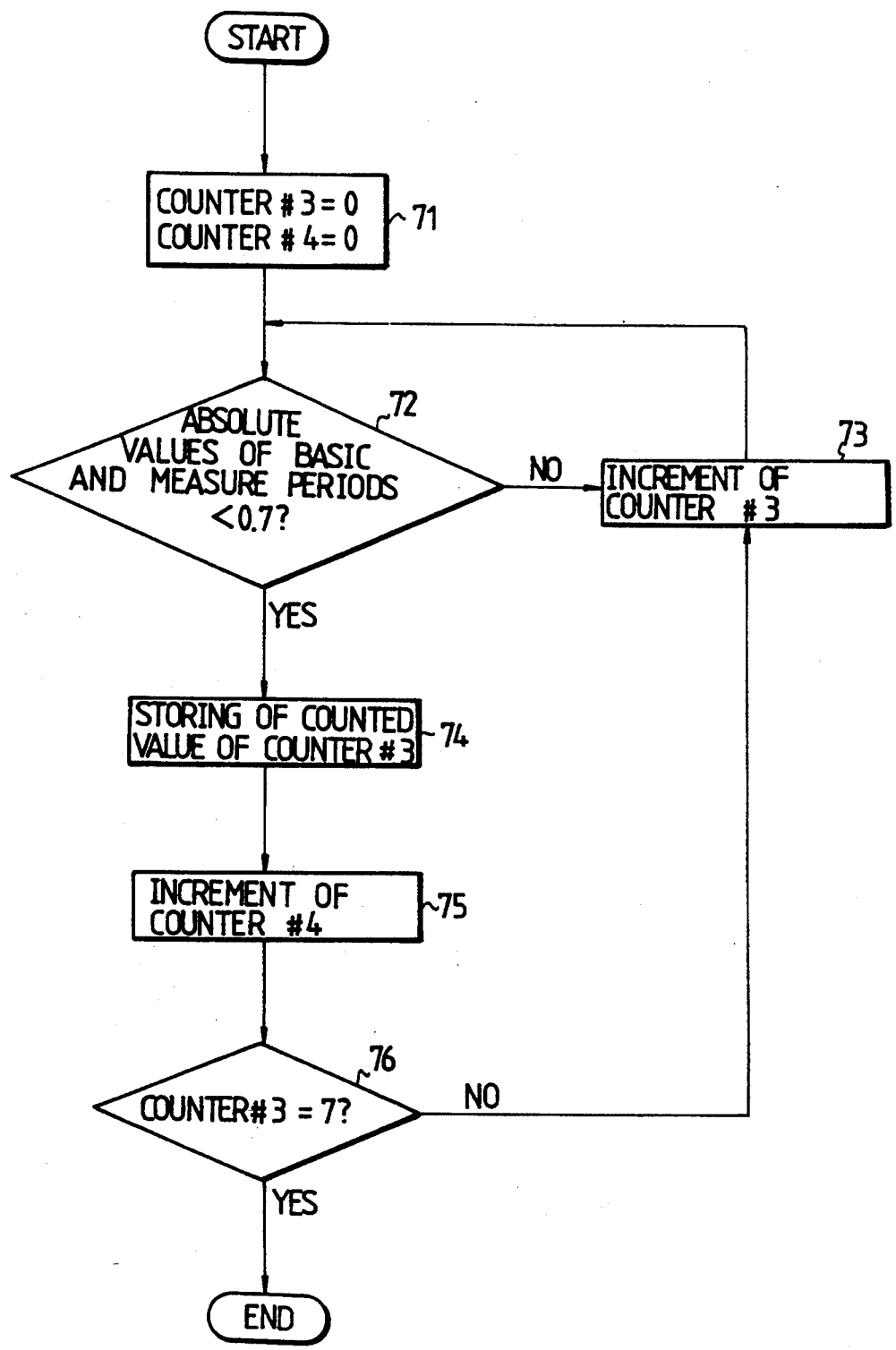
FIG. 6 is a flow chart illustrating a procedure for extracting values of object signals to be calculated.

FIG. 6 is a flow chart illustrating a procedure for executing the step 33 of extracting the values of the object signals as described in FIG. 3.

First, an initialization for third and fourth counters #3 and #4 is made first at a step 71. The third counter #3 is adapted to search signal pairs each including each of the 8 signals of the basic period and each corresponding one of the 8 signals of the measure period. On the other hand, the fourth counter #4 is adapted to store the number of the object signal pairs. Thereafter, a determination is made at a step 72 about whether the current signal pair is the object signal pair including both signal values present between −0.7071 and +0.7071. This determination is achieved by detecting whether the absolute signal value of the current signal pair is less than 0.7.

When the absolute signal value of the current signal pair has been determined at the step 72 not to be less than 0.7, an increment by one is executed for the third counter #3 at the step 73. The procedure is then returned to the step 72 of searching the absolute signal value of less than 0.7. If the absolute signal value is less than 0.7, the counted value of the third counter #3 is stored at a step 74. Subsequently, an increment by one is executed for the fourth counter #4 at a step 75. A determination is made at a step 76 about whether the counted value of the third counter #3 indicative of the number of searched signal pairs corresponds to 7. When the counted value of the third counter #3 corresponds to 7, the procedure is completed. If not, the procedure is returned to the step 73.

Figure 7:
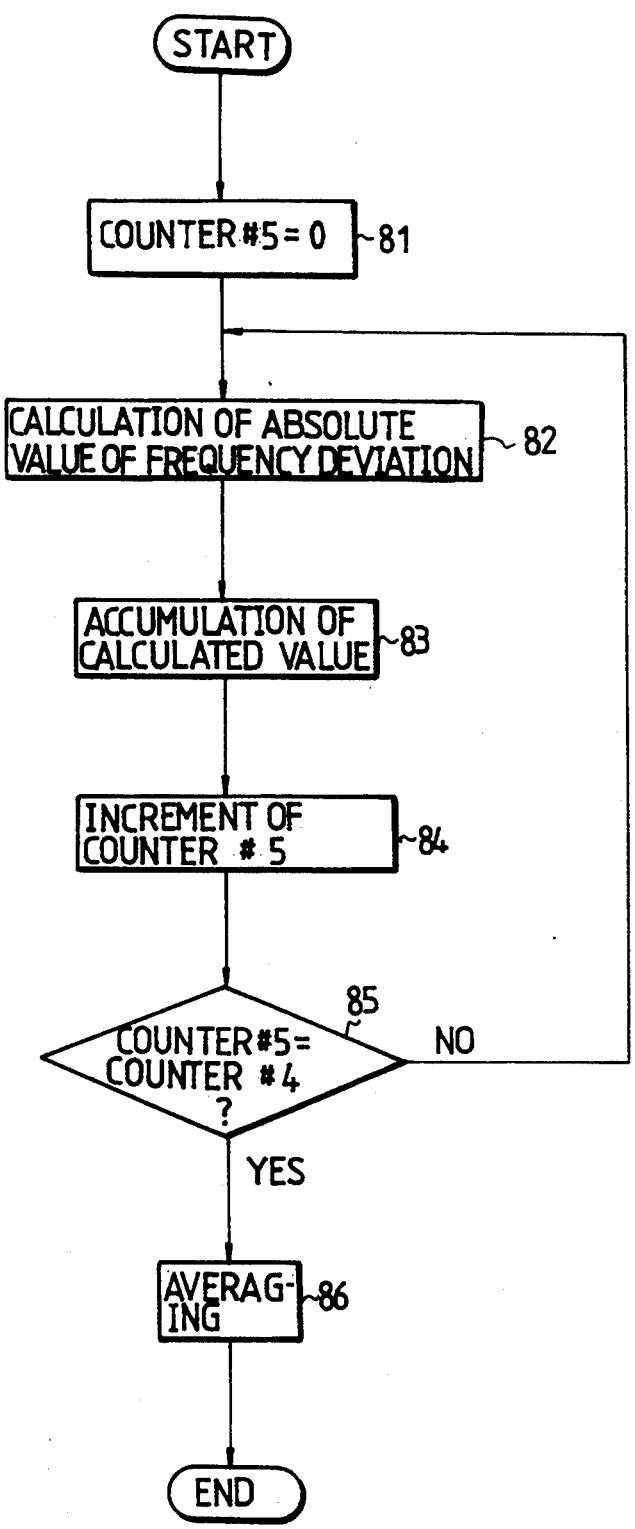
FIG. 7 is a flow chart illustrating a procedure for calculating the absolute value of frequency deviation.

FIG. 7 is a flow chart illustrating a procedure for executing the step 34 of calculating the absolute value of frequency deviation.

First, an initialization is carried out for a fifth counter #5 so as to make the fifth counter #5 have an initial value of zero, at a step 81. Thereafter, a step 82 is executed for calculating an absolute value of the frequency deviation of each object signal pair determined by the procedure of FIG. 6. The calculation is achieved by use of the following equation (1):

$$[FO \times \{\text{Inverse-sin}(|M<i>|) - \text{Inverse-sin}(|B<i>|)\}]/2\pi m \qquad (1)$$

wherein, $M<i>$: object signal values of the measure period;
$B<i>$: object signal values of the basic period;
$|\ |$: an absolute value function;
Inverse-sin ( ): an inverse sine wave function;
FO: the frequency of test signals which is 1 KHz in the illustrated case;
m: an integer resulted from a division of the number of signals including the signals present between the basic period and the measure period and the signals of the basic period by a factor of 8, which integer m is 20 in the illustrated case including the 8 signals of the basic period and the 152 signals present between the basic period and the measure period.

The calculated absolute value is accumulated at a step 83. Then, an increment by one is executed for the fifth counter #5 at a step 84. This counted value of the fifth counter #5 is compared with the counted value of the fourth counter #4 at a step 85. These steps are repeated for all the object signal pairs so as to accumulate all the absolute values of frequency deviations of all object signal pairs. Subsequently, the resultant value is averaged at a step 86 so as to obtain an absolute value of the frequency deviation.

Figure 8A:
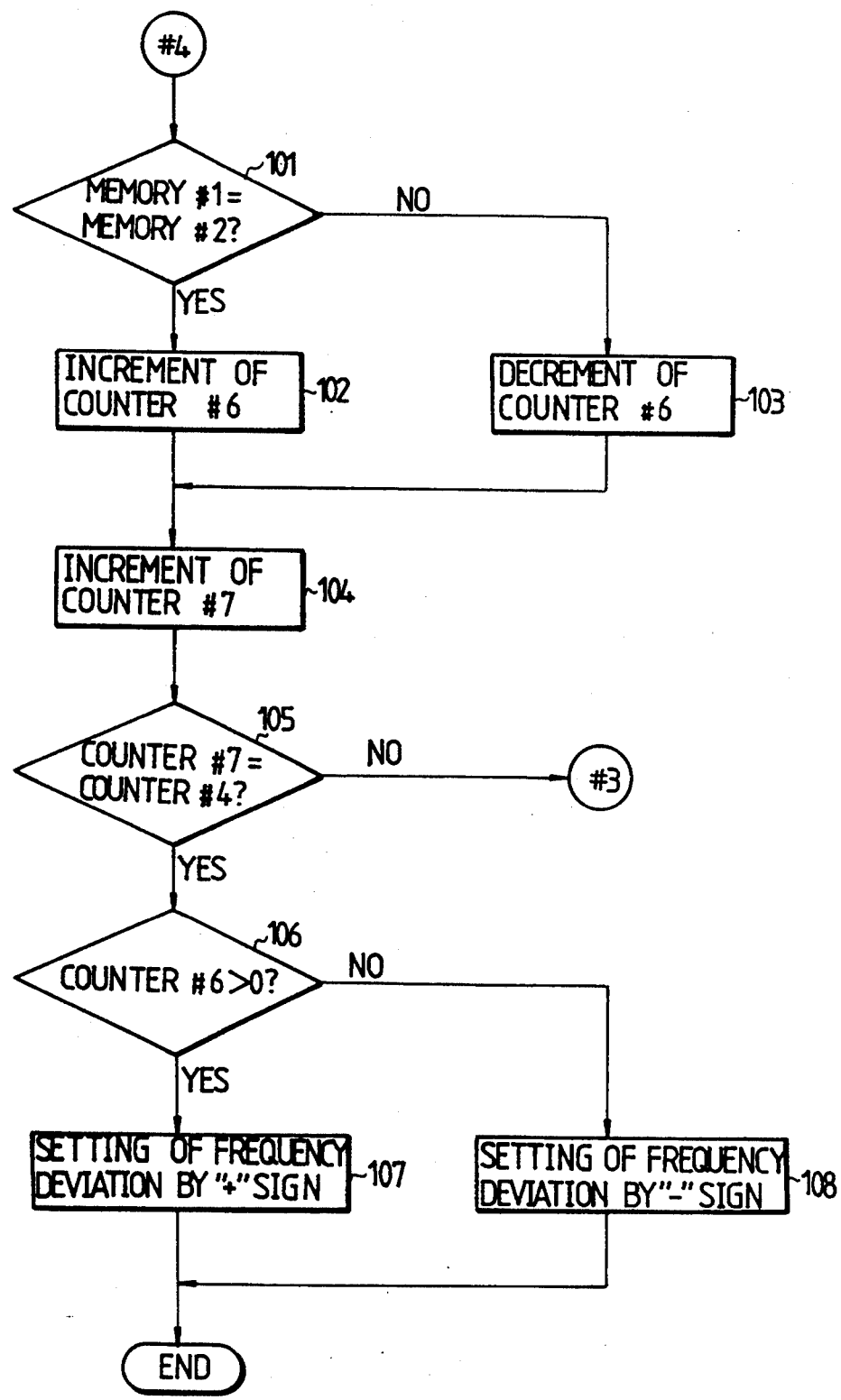
FIGS. 8A and 8B are flow charts respectively illustrating a procedure for determining the direction of the frequency deviation.
Figure 8B:
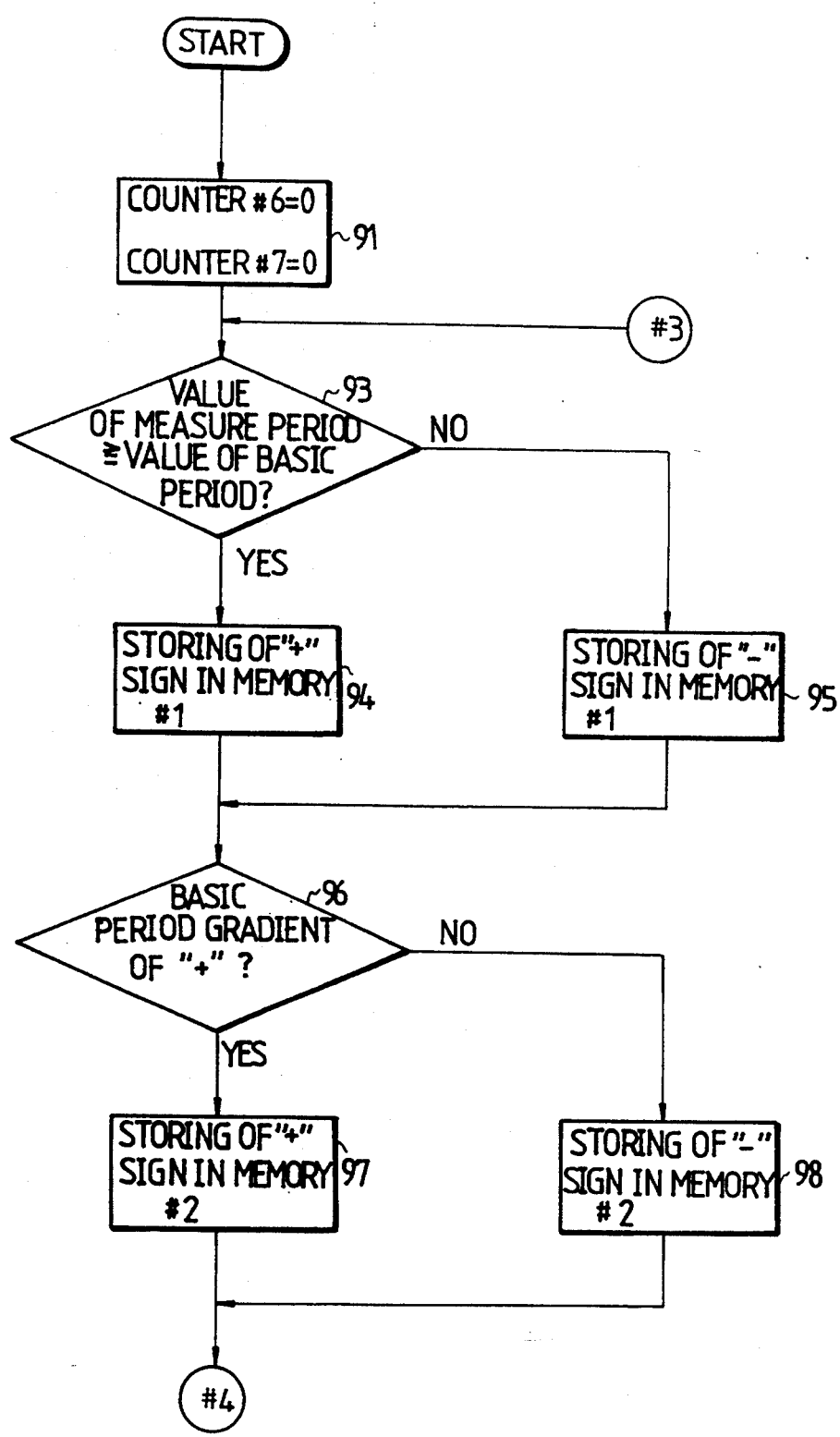
Figure 9:
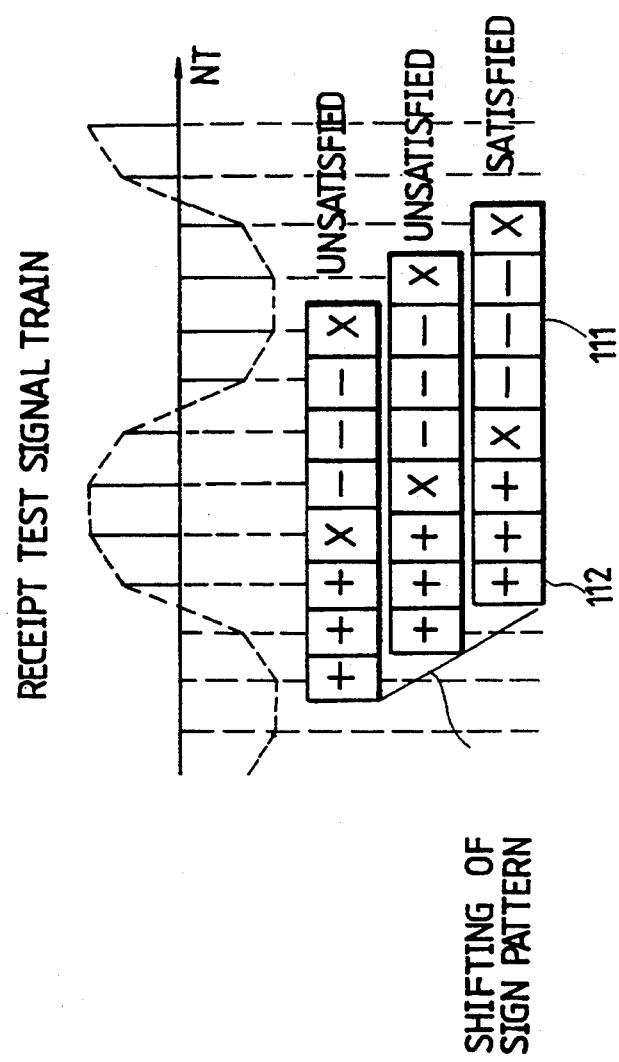
FIG. 9 is a schematic view explaining a search for a basic period by use of a predetermined sign pattern.

FIGS. 8A and 8B are flow charts respectively illustrating a procedure for executing the step 35 of determining the direction of the frequency deviation.

The object signal pairs are processed in this procedure too. First, an initialization is carried out for sixth and seventh counters #6 and #7 at a step 91. For each object signal pair, a determination is then made at a step 93 about whether the signal value of the measure period is not lower then the signal value of the basic period. When the signal value of the measure period is not lower then the signal value of the basic period, a positive (+) sign is stored in a first memory #1 at a step 94. If not, a negative (−) sign is stored in the first memory #1 at a step 95. For example, where the above procedure with respect to the steps 93, 94 and 95 is carried out for the eighth object signal pair shown in FIG. 11, two signals denoted by the reference numeral 132 are compared with each other. Since the signal value of the measure period is higher than the signal value of the basic period, a positive (+) sign is stored in the first memory #1.

Next, a determination is made at a step 96 about whether the signal value of the basic period in the current object signal pair is higher than the signal value of the basic period in the previous object signal pair, that is, whether the current gradient of the basic period is positive. When the current gradient of the basic period is positive, a positive (+) sign is stored in a second memory #2 at a step 97. If not, a negative (−) sign is stored in the second memory #2 at a step 98.

Where the current object signal of the basic period is the first signal value followed by no previous signal value, it is compared with the last signal value of the same basic period.

For example, where the above procedure with respect to the steps 96, 97 and 98 is carried out for the eighth object signal of the basic period shown in FIG. 11, two signals denoted by the reference numeral 131 are compared with each other. Since the current signal value is higher than the previous signal value, a positive (+) sign is stored in the second memory #2.

Thereafter, the stored sign of the first memory #1 is compared with the stored sign of the second memory #2 at a step 101. When the first and second memories #1 and #2 have the same sign, an increment by one is executed in the sixth counter #6 at a step 102. If not, a decrement by one is executed in the sixth counter #6 at a step 103.

For example, where the above procedure with respect to the steps 101, 102 and 103 is carried out for the eighth object signal pair shown in FIG. 11, an increment by one is executed in the sixth counter #6 because the first and second memories #1 and #2 have the same sign.

Following the procedure with respect to the steps 101, 102 and 103, an increment by one is executed in the seventh counter #7 at a step 104. This counted value of the seventh counter #7 is compared with the counted value of the fourth counter #4 at a step 105. Then, the procedure is returned to the step 92 so that the above procedure with respect to the steps 93 to 105 can be repeated for all the object signal pairs. When the current condition satisfies the condition of the step 105, that is, when the counted value of the seventh counter #7 is the same as the counted value of the fourth counter #4, a check is then made about the counted value of the sixth counter #6 at a step 106. When the counted value of the sixth counter #6 has been detected not to be less than zero, the sign of the frequency deviation is determined to be positive (+) at a step 107. If not, the sign of the frequency deviation is determined to be negative (−) at a step 108.

A rule for the sign determination is illustrated in the form of a table in FIG. 12. In the table of FIG. 12, the reference numeral 141 denotes the gradient of the basic period which is determined by the procedure with respect to the steps 96, 97 and 98. When the current object signal value of the basic period is higher than the previous, adjacent object signal value, the gradient of the basic period is denoted by the positive (+) sign. If not, the gradient of the basic period is denoted by the negative (−) sign. The reference numeral 142 denotes the difference in signal value of each object signal pair which is determined by the procedure with respect to the steps 93, 94 and 95. When the signal value of the measure period is not lower then the signal value of the basic period, the signal value difference is denoted by the positive (+) sign. If not, the signal value difference is denoted by the negative (−) sign. On the other hand, the reference numeral 143 denotes the sign of the deviation which is determined by a multiplication of the gradient of the basic period and the difference in signal value. By this multiplication, the final frequency deviation is determined too.

When it is desired to obtain a higher accuracy by reducing a measurement error, a multi-period system may be utilized, as shown in FIGS. 10A and 10B. In this case, each multi-period is processed in accordance with the above-mentioned procedure of FIG. 3 so as to derive its frequency deviation. From respective frequency deviations of all the multi-periods, the final deviation is determined. Accordingly, it is possible to reduce an effect of noise on test signals.

As apparent from the above description, the present invention makes it possible to detect fine frequency deviations generated in transmission lines in a short time. Where the present invention is applied to a transmission system in which the frequency deviation serves as a factor causing a degradation in communication performance, an improvement in communication performance can be obtained by detecting the frequency deviation, then using the detected frequency deviation as a modulating frequency of a single-sideband modulator, and thereby compensating the detected frequency deviation. In some cases, the degree of the frequency deviation is utilized as a measure for evaluating the transmission quality of communication lines. Where the present invention is applied to these cases, the measurement can be improved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for detecting a fine frequency deviation by use of a frequency deviation detecting apparatus comprising a central processing unit, a program memory, a signal collector serving as a digital convertor for collecting a test signal received and converting the test signal into digital signals, a data memory for temporarily storing the test signal after the signal collection, a job location memory for storing a job location adapted to temporarily store an intermediate calculation result or data to be instantly used, said method comprising the steps of:

(A) selecting, from frequencies obtained when a sampling frequency of a receiving unit is divided by a positive integer, a frequency included in a transmission channel band as a frequency of the test signal, transmitting the test signal having the selected frequency to a transmission channel to be tested, receiving the test signal from said transmission channel, detecting a basic period from said received test signal, and determining a measure period on the basis of said detected basic period;

(B) performing a normalization by use of the basic period determined at said step (A);

(C) extracting values of signals to be calculated, namely, object signals from those of the basic and measure periods;

(D) calculating respective absolute values of said object signals, averaging said calculated absolute values, and thereby calculating an absolute value of frequency deviation and determining a sign or direction of the frequency deviation; and (E) determining a final frequency deviation on the basis of said sign determined from said absolute value of frequency deviation.

2. A method in accordance with claim 1, wherein the detecting said basic period at said step (A) comprises the steps of:

(a) selecting a first counter adapted to search whether at least a predetermined number of continued sine wave periods appear and a second counter adapted to determine a range for a sign pattern search, initializing said first and second counters and an average signal power, searching a sign pattern of each period, and determining whether a current period being currently searched satisfies a predetermined sign pattern;

(b) making a determination that no test signal has been received yet when the current period has been determined at said step (a) not to satisfy the predetermined sign pattern, then incrementing a counted value of the second counter by one, making a determination that no test signal has been arrived yet when a resultant counted value of the second counter is not less than a first predetermined value, then initializing the first and second counters and the average signal power and continuously performing said sign pattern search, while making a determination that this step corresponds to a step of searching continued sine wave periods when said resultant counted value of the second counter is less than said first predetermined value, and then performing only the sign pattern search without any initialization for a counting operation;

(c) calculating an average signal power for each period satisfying the predetermined sign pattern, determining whether a previous average signal power is zero, storing said average signal power currently calculated when said previous average signal power is zero, comparing, when a previous average signal power has been present, a current average signal power with said previous average signal power to detect whether the current average signal power is not less than a predetermined multiple of the previous average signal power, averaging the current average signal power and the previous average signal power when the current average signal power is not less than the predetermined multiple of the previous average signal power, storing the resultant average value, while resetting the first and second counters as zero when the current average signal power is less than the predetermined multiple of the previous average signal power, and then returning the procedure to said step (a) of searching a sign pattern of each period and of determining whether the current period searched satisfies a predetermined sign pattern; and (d) incrementing a counted value of the first counter by one after execution of said step (c), determining the current period satisfying the predetermined sign pattern as the basic period when the resultant counted value of the first counter is not less than a second predetermined value, and stored the current period, while resetting the second counter to zero when the resultant counted value of the first counter is less than said second predetermined value, receiving a predetermined number of test signals, shifting the predetermined sign pattern corresponding to said signal receipt, and returning the procedure to said step (a) of searching a sign pattern of each period and of determining whether the period currently searched satisfies a predetermined sign pattern.

3. A method in accordance with claim 1, wherein said step (B) comprises the steps of:

(a) calculating an average and a standard deviation of a predetermined number of test signals including test signals of said detected basic period and test signals following said test signals of the basic period, and deriving a gain for normalizing said calculated standard deviation; and (b) determining said measure period by use of a predetermined number of test signals subsequently received after execution of said step (a), multiplying signal values of the determined basic and measure periods by said normalizing gain, and storing the resultant values.

4. A method in accordance with claim 1, wherein said step (C) comprises the steps of:

(a) selecting a first counter adapted to search signal pairs, each signal pair including each of a predetermined number of test signals of said basic period and each corresponding one of test signals of said measure period, and a second counter adapted to store a number of signal pairs to be calculated, namely, object signal pairs, initializing said first and second counters, and checking whether each of said signal pairs includes both signal values respectively having absolute values less than a first predetermined value;

(b) incrementing a counted value of the first counter by one when said absolute signal values of a current signal pair being currently checked has been determined not to be less than said first predetermined value, and returning the procedure to said step (a) of checking absolute signal values of less than the first predetermined value, whereas storing said counted value of the first counter when the current signal pairs include both signal values respectively having absolute values less than the first predetermined value, incrementing a counted value of the second counter by one, checking whether the stored counted value of the first counter indicative of the number of checked signal pairs corresponds to a second predetermined value, completing the procedure when the stored counted value of the first counter corresponds to said second predetermined value, while returning the procedure to the initial stage of this step of incrementing the counted value of the first counter when the stored counted value of the first counter does not correspond to the second predetermined value.

5. A method in accordance with claim 1, wherein the calculating of said absolute value of the frequency deviation at said step (D) comprises the steps of:
  (a) selecting a counter adapted to average absolute values calculated, and initializing said counter to have a counted value of zero; and
  (b) calculating an absolute value of a frequency deviation of each signal pair determined to be calculated, namely, each object signal pair, averaging absolute values of all of object signal pairs, and deriving the absolute value of the frequency deviation from the resultant average.

6. A method in accordance with claim 1, where the determining said direction of the frequency deviation comprises the steps of:
  (a) selecting a first counter and a second counter, initializing said first and second counters, storing a positive sign in a first memory location when each object signal of said measure period has a signal value not lower than that of each corresponding object signal of said basic period, while storing a negative sign in said first memory location when said signal value of the measure period is lower than that of the basic period;
  (b) storing a positive sign in a second memory location when said signal value of the current object signal of the basic period is higher than that of a previous object signal of the same basic period, while storing a negative sign in said second memory location when the signal value of the current object signal is not higher than that of said previous object signal;
  (c) comparing the first and second memory locations with each other, incrementing a counted value of said first counter by one when the first and second memory locations have the same sign, while decrementing said counted value of the first counter by one when the first and second memory locations have different signs;
  (d) incrementing a counted value of said second counter, and repeating all previous steps until all the object signals are processed;
  (e) checking whether the resultant counted value of the first counter is not less than zero, setting said sign of the frequency deviation to be positive value when the resultant counted value of the first counter is not less than zero, while setting the sign of the frequency deviation to be a negative value when the resultant counted value of the first counter is less than zero.

* * * * *